United States Patent Office 2,958,395
Patented Nov. 1, 1960

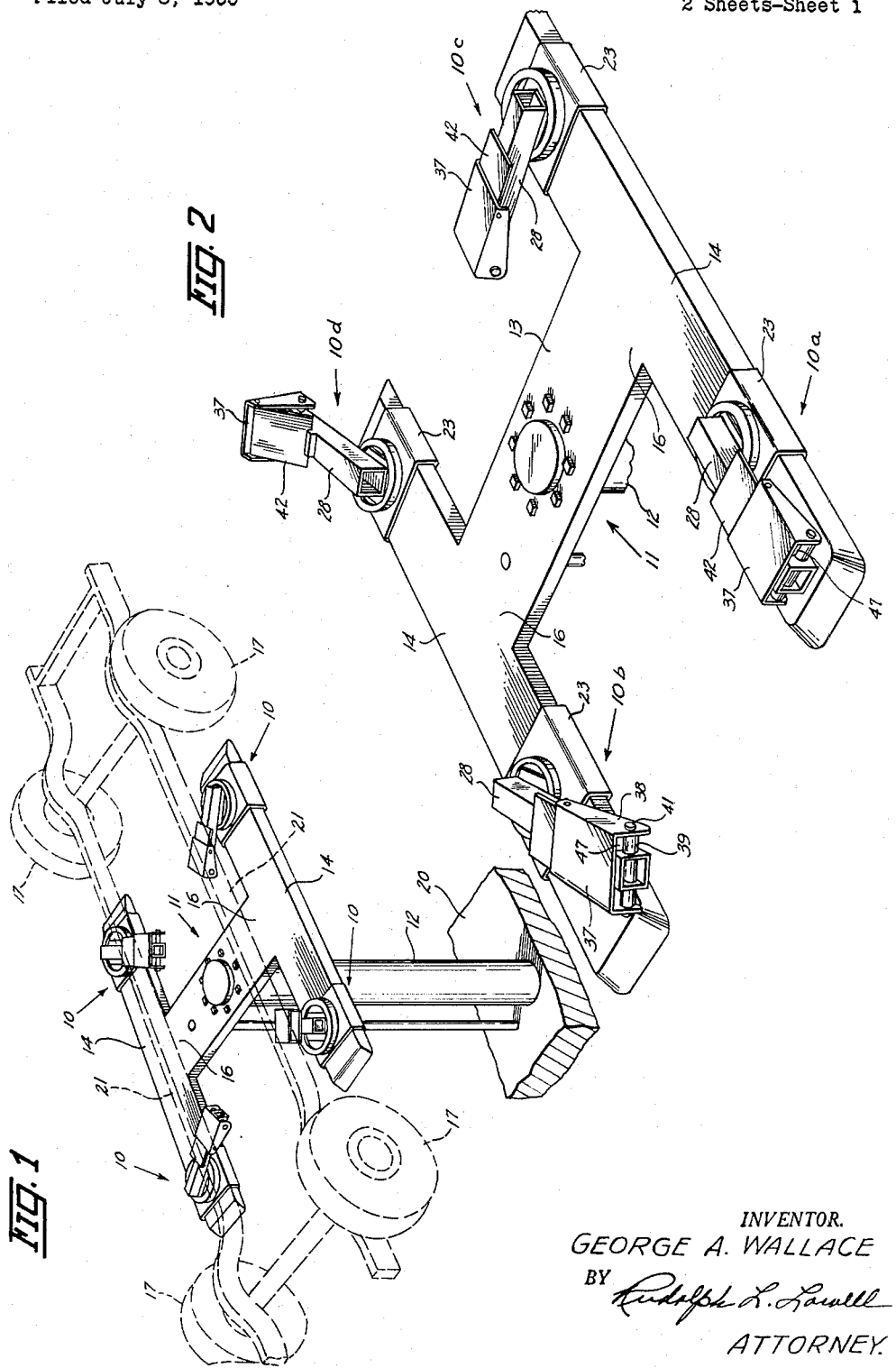

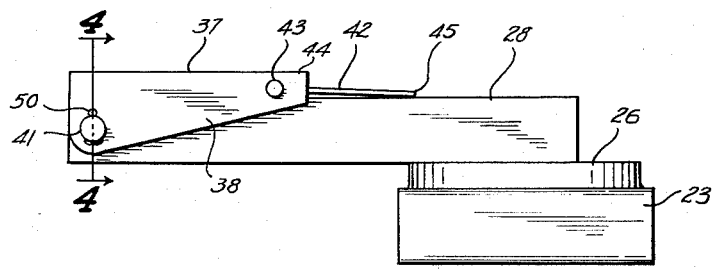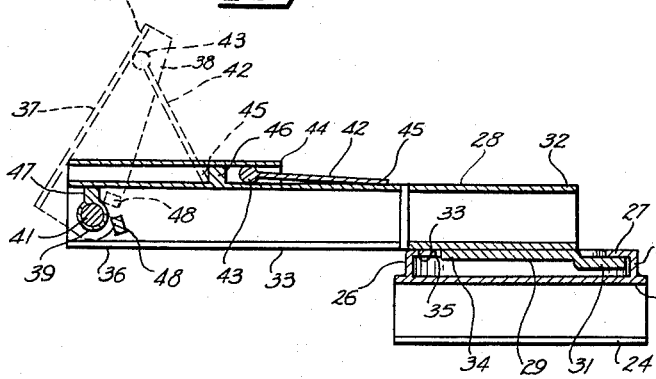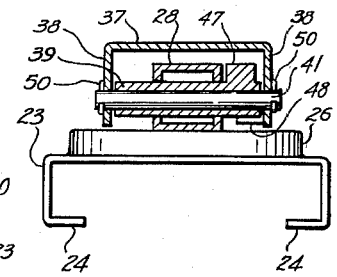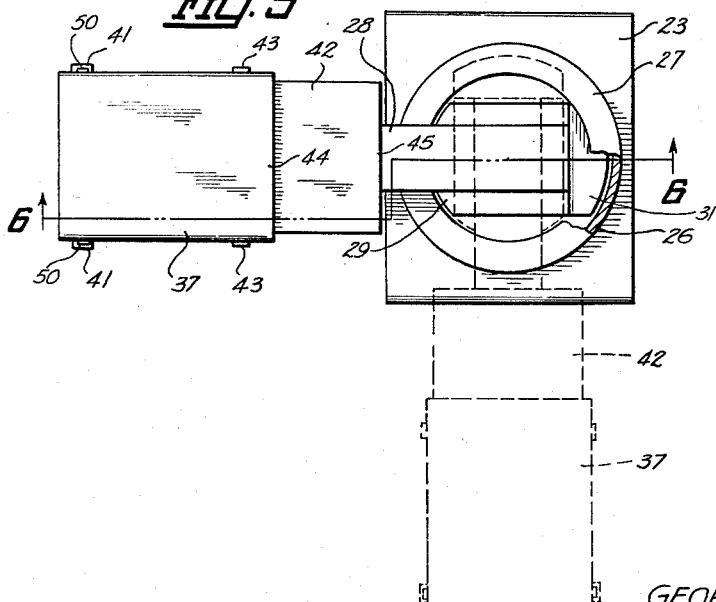

2,958,395

FRAME ENGAGING UNIT FOR VEHICLE HOISTS

George A. Wallace, Philadelphia, Pa., assignor, by mesne assignments, to Globe Hoist Company, Philadelphia, Pa., a corporation of Maryland Filed July 8, 1955, Ser. No. 520,874

5 Claims. (Cl. 187—8.75)

This invention relates generally to vehicle hoists and more particularly to adjustably movable frame engaging units adapted to be mounted on hoists of vehicle frame engaging type.

Due to the extreme variations in frame sizes in automobiles now in use, considerable difficulty is encountered in adapting frame engaging hoists for use in elevating all automobiles such as the usual American cars, small sports cars, and foreign made cars. The problem is further complicated by the fact that many vehicles have under parts, such as generators, compressors, exhaust pipes and the like that are closely adjacent to the vehicle frame side members and which must be cleared by the frame engaging members of the hoist in a vehicle lifting operation. As a result, many different adaptors have been used with hoists in an effort to adapt the hoists to all types and models of cars and small trucks, thus increasing the number of hoist parts which must be maintained and used by hoist operators.

It is an object of this invention, therefore, to provide an improved frame engaging unit for vehicle hoists.

Another object of this invention is to provide a frame engaging unit which is useable with a vehicle hoist to adapt the hoist for use on all models of automobiles and small trucks now in use.

A further object of this invention is to provide frame engaging units which are adapted to be removably mounted on vehicle hoists and which are provided with frame engaging members adjustably movable both longitudinally and transversely of the hoist to selected frame engaging positions.

Another object of this invention is to provide a vehicle frame engaging unit for a vehicle hoist in which a member is movable to vertically adjusted positions to further adapt the vehicle hoist for use with all models of automobiles and small trucks.

Yet another object of this invention is to provide a vehicle frame engaging unit for use with a vehicle hoist, in which portions of the unit are selectively removable from the hoist to readily adapt the hoist for lifting various types of vehicles.

Still a further object of this invention is to provide a vehicle frame engaging unit for a vehicle hoist which is simple in construction, economical in cost, and efficient in operation to adapt a hoist for use with all automobiles and small trucks now in use.

Further objects, features, and advantages of this invention will become apparent from a consideration of the following description when taken in connection with the accompanying drawing in which:

Fig. 1 is a perspective view of a vehicle hoist embodying the frame engaging units of this invention, and showing the units arranged to lift a short wheel base vehicle having side frame members spaced closer together than the side members of the hoist;

Fig. 2 is an enlarged perspective view of the hoist and the vehicle frame engaging units illustrated in Fig. 1, showing the hoist in a lowered position and illustrating various adjusted positions for the vehicle frame engaging units;

Fig. 3 is an enlarged side elevational view of the frame engaging unit of this invention;

Fig. 4 is a transverse sectional view as seen along the line 4—4 in Fig. 3;

Fig. 5 is a top plan view of the frame engaging unit of this invention showing an adjusted position of the unit in dotted lines and with some parts broken away and other parts shown in section for the purpose of clarity; and Fig. 6 is a longitudinal sectional view looking along the line 6—6 in Fig. 5 and showing a vertically moved position for the frame engaging member of the unit in dotted lines.

With reference to the drawing, four frame engaging units of this invention, indicated generally at 10, are illustrated in Fig. 1 in assembly relation with a pit mounted vehicle hoist 11 of a vehicle frame engaging type. The hoist 11 has a lift piston 12 and a superstructure including a transversely extended beam or plate 13 secured to the upper end of the piston 12. A pair of longitudinally extended horizontal vehicle frame engaging and supporting members 14, of a flat plate construction, are secured to opposite ends 16 of the beam 13. The frame supporting members 14 are of a length to be positioned between the front and rear wheels 17 of a usual type vehicle such as a Buick, Chrysler or Ford, and are spaced a distance apart to underlie the side members of the main frames (not shown) for such vehicles. The lift member 12 is cooperatively associated with a cylinder (not shown) mounted below the floor surface 20 and is raised and lowered in a well known manner by a hydraulic control system (not shown).

As shown in Fig. 1, each supporting member 14 is provided with a pair of the units 10. Since the frame engaging units 10 are of a like construction, only one unit 10 will be described in detail, with like numerals indicating like parts on the units 10.

A frame engaging unit 10 includes a channel shape support or base member 23 of a size to be removably received on a frame supporting member 14 in a straddling relation therewith and having inturned flanges 24 for engaging the opposite sides of the bottom of a member 14. Secured to and extended upwardly from a supporting member 23 is a short upright tubular member 26 provided at its upper end with an inwardly directed peripheral flange or bearing 27 (Fig. 6) arranged in a substantially parallel spaced relation with the supporting member 23. An elongated tubular arm member 28 (Figs. 2, 3, and 6), of a rectangular shape in transverse section, carries a plate member 29 having a downwardly offset free end portion 31 projected outwardly from and arranged below one end 32 of the arm member 28.

In the assembly of the arm member 28 with the tubular member 26, the plate end portion 31 is received between the flange 27 on the tubular member 26 and the supporting member 23. The plate 29 is received within the tubular member 26 and the under side 33 of the arm member 28 is supported directly on the flange 27. As best appears in Fig. 5, the plate end portion 31 is offset an amount to provide for the engagement thereof with the underside of a portion of the flange 27 when the arm 28 is arranged in a substantially horizontal position and supported directly on a diametrically opposite portion of the flange 27. The plate 29 is of a length to provide for its reception within the tubular member 26. The supported end 34 of the plate 29 is adjacent the terminal end 35 of the flange 27 and the free end portion is adjacent the upright body portion 40 of the tubular member 26 to preclude any substantial longitudinal movement of the arm 28.

It can thus be seen that the arm 28 is supported against any downward tilting movement relative to the tubular member 26 by virtue of the arrangement of the free end portion 31 of the plate 29 between the flange 27 and the supporting member 23. However, the arm 28 is readily removed from its supported position on the tubular member 26 by raising the arm 28 to a position in which the supported end 34 of the plate 29 is above the flange 27. The tubular arm member 28 is then moved longitudinally to a position in which the plate portion 31 is withdrawn from its position between the flange 27 and the supporting member 23.

Pivotally supported on the opposite end 36 of the arm member 28 is a frame engaging member 37 (Figs. 2, 3, and 6) having downwardly projected ears or flanges 38 extended longitudinally thereof. As best appears in Figs. 2 and 6, the ears 38 are arranged on opposite sides of the arm 28 in a transversely spaced relation therewith. For pivotally supporting the member 37, a pin or pivot members 41 is extended through the ears 38 and maintained therein by keys or stops 50. A tubular member or bearing 39 secured to and extended transversely through the arm 28, rotatably supports the pin 41.

It can thus be seen (Figs. 2 and 6) that the frame engaging member 37 is pivotally movable in up and down directions about the pivot 41 between the horizontal and substantially upright positions shown in Fig. 6. For maintaining the frame engaging member 37 in its upright position, a brace member 42, of a flat plate construction, is pivotally connected, by means of a pivot 43 to the frame engaging member 37, adjacent the free end 44 thereof at a position between the ears 38. The free end 45 of the brace member 42 is engageable with an upwardly projected stop member 46 on the top side of the arm 28, intermediate the ends thereof, in the raised position of the frame engaging member 37, for maintaining the member 37 against any pivotal movement in one direction. The member 37 and the brace 42 are thus foldably connected for movement between two positions, namely a substantially upright position and a horizontal position.

A pair of coacting stop members 47 and 48 on the tubular bearing 39 and one of the ears 38, respectively, are engageable to maintain the frame engaging member 37 against any pivotal movement in the opposite direction. As best appears in Fig. 6, in the raised position of the frame engaging member 37, in which the end 45 of the brace 42 is engaged with the stop 46, the stops 47 and 48 are spaced apart sufficiently to permit a limited pivotal movement of the frame engaging member 37 necessary to disengage the brace 42 from the stop 46.

In use, a vehicle to be elevated is driven to a position in which the vehicle side frame members 21 are above the hoist 11, and in a substantially centered relation with the lift 12. The arms 28 are rotated to position the frame engaging members 37 for the four frame engaging units 10 on the hoist 11 opposite the side frame members 21. As indicated in Fig. 2 for the frame engaging unit designated as 10a, the arm 28 may extend longitudinally of the frame supporting member 14 in the event the spacing of the vehicle side frame members 21 corresponds to the spacing of the frame supporting members 14. In the event the spacing of the side frame members 21 is only slightly less than the spacing of the frame supporting members 14, the arm member 28 is rotated on the tubular member 26 so that the arm 28 is inclined relative to the corresponding frame supporting member 14 as shown for the unit designated as 10b in Fig. 2. For such a position of the arm 28, the frame engaging member 37 is positioned slightly inwardly of the corresponding frame supporting member 14.

In the event the spacing of the vehicle side frame members 21 is substantially less than the spacing of the frame supporting members 14, as in a case of a foreign or sports car, the arm members 28 for the units 10 are rotated to a position extended substantially transversely of the corresponding frame member 14 as indicated for the frame engaging unit designated 10c in Fig. 2. In case the spacing of the side frame members 21 is greater than the spacing of the frame supporting members 14, the arm members 28 are, of course, reversely rotated to position the frame engaging members 37 outwardly of the frame supporting members 14.

In the event the vehicle to be elevated has under parts which might be engaged by the hoist or the frame engaging units 10 if the hoist was raised with the units 10 in the lowered positions illustrated for the units 10a, 10b and 10c in Fig. 2, the frame engaging members 37 are swung upwardly to braced positions like the position illustrated for the member 37 for the unit 10d in Fig. 2. Thus, on raising of the hoist 11, the frame engaging members 37 engage the frame side members 21 at longitudinally spaced positions thereon, with the vehicle under parts in a clearance relation with the hoist 11.

In the event the vehicle to be elevated has an extremely low frame which will not clear the hoist 11 with the arms 28 and frame engaging members 37 mounted thereon, the arms 28 are readily lifted and moved out of their supported positions on the tubular members 26 as previously described. On raising of the hoist 11 to elevate the vehicle, therefore, the vehicle side frame members 21 are engaged directly by the flanges 27 on the upper ends of the tubular members 26.

Also, the frame engaging units 10 are readily removed from their corresponding frame supporting members 14 by merely sliding the support members 23 off the ends of the frame supporting member 14, for engagement of the vehicle side frame members 21 directly by the frame supporting members 14. When the hoist 11 is in a lowered position, as shown in Fig. 2, the beam 13 and the frame supporting members 14 are spaced slightly above the floor surface 20 by virtue of a stop (not shown) on the lift member 12 to facilitate the assembly and disassembly of the units 10 on the members 14.

From a consideration of the above description, it is seen that this invention provides frame engaging units 10 which are readily mounted on and removed from substantially any frame engaging type hoist now in use. When provided with the units 10, the hoist 11 is capable of elevating substantially any automobile or small truck now in use.

Although the invention has been described with respect to a preferred embodiment thereof, it is to be understood that it is not to be so limited since changes can be made therein which are within the full intended scope of this invention as defined by the appended claims.

I claim:

1. A frame engaging unit for a vehicle hoist having a lift member which carries a horizontal longitudinally extended member at its upper end for supporting the frame of a vehicle to be elevated, said vehicle frame engaging unit including a support member adapted to be removably mounted on said longitudinally extended member, an upright tubular member secured to and extended upwardly from support member, an inwardly extended annular flange adjacent the top end of said tubular member, a substantially horizontal arm member, plate means of an annular shape secured to the underside of said arm member and of a size to be received within said annular flange, a downwardly and outwardly projected offset portion on said plate means receivable between said support member and said flange to connect said arm with said flange for horizontal swinging movement on said tube member, and frame engaging means on said arm member.

2. A frame engaging unit for a vehicle hoist having a lift member which carries a horizontal, longitudinally extended member at its upper end for supporting the frame of a vehicle to be elevated, said vehicle frame engaging unit comprising, support means mounted on said extended member, said supporting means including an upright tubular member having an opening defined by an inwardly extended annular flange, and frame engaging arm means including a plate having a free end with a width less than the inner diameter of said annular flange, whereby said plate free end is removably insertable in an acute angular manner through said opening and beneath a portion of said flange, with a portion of said plate resting on said flange, and may be rotated without being removed from said upright tubular member.

3. A frame engaging unit for a vehicle hoist having a lift member which carries a horizontal, longitudinally extended member at its upper end for supporting the frame of a vehicle to be elevated, said vehicle frame engaging unit comprising, support means mounted on said extended member and including an upright tubular member having an opening defined by an inwardly extended annular flange, an elongated arm member, means for engaging said frame secured to one end of said arm member and a plate element secured to the other end of said arm member, said plate element being slightly offset from the bottom of said arm member, having a width less than the inner diameter of said annular flange, and having a free end arcuate in a manner complementary with said annular flange, whereby said plate element is removably insertable in an acute angular manner through said opening such that its free end is below said flange and with said arm member resting in a horizontal manner on said flange.

4. A frame engaging unit for a vehicle hoist having elongated supporting legs, said unit comprising a slide member including a longitudinal internal channel which receives one of said legs for anchoring said slide member to said leg and permitting said slide member to slide longitudinally along said leg, a horizontal arm, first pivot means having a vertical axis of rotation securing said horizontal arm to said slide member and permitting it to rotate in a horizontal plane, a frame engaging member, second pivot means having a horizontal axis of rotation securing said frame engaging member to said arm and permitting its movement from a position disposed substantially parallel and adjacent to said arm to a position disposed at an angle to said arm, and stop means reacting between said frame engaging member and said arm to maintain said frame engaging member at said angle when it is contacting and lifting a vehicle.

5. A vehicle hoist comprising an H-shaped frame having four elongated supporting legs, and one of said frame engaging units as set forth in claim 4 being engaged upon each of said legs with said legs inserted within said longitudinal internal channels of said units.

References Cited in the file of this patent

UNITED STATES PATENTS

| | | |
|---|---|---|
| 2,458,986 | Frey | Jan. 11, 1949 |
| 2,568,271 | Campagna et al. | Sept. 18, 1951 |
| 2,612,355 | Thompson | Sept. 30, 1952 |
| 2,659,455 | Green | Nov. 17, 1953 |
| 2,736,104 | Sherman | Feb. 28, 1956 |
| 2,769,507 | Pelouch | Nov. 6, 1956 |
| 2,826,269 | Harr | Mar. 11, 1958 |